(12) United States Patent
Menzel et al.

(10) Patent No.: US 7,270,320 B2
(45) Date of Patent: Sep. 18, 2007

(54) ANTIVIBRATION ELEMENT (75) Inventors: Johannes Menzel, Wernau (DE); Günter Wolf, Oppenweiler (DE); Helmut Lux, Waiblingen (DE); Jens Kutzbach, Schlaitdorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/629,674

(22) Filed: Jul. 30, 2003

(65) Prior Publication Data

US 2004/0119216 A1    Jun. 24, 2004

(30) Foreign Application Priority Data

Jul. 30, 2002    (DE) ............................... 102 34 511

(51) Int. Cl.
*F16F 1/06* (2006.01)
(52) U.S. Cl. ................... 267/175; 267/137; 267/166; 267/179; 173/162.2
(58) Field of Classification Search ............. 267/137, 267/140.2, 155, 166, 166.1, 167, 170, 175, 267/177, 178, 179, 286; 464/51, 61; 248/560, 248/638; 173/162.1, 162.2
See application file for complete search history.

(56) References Cited

U.S. PATENT DOCUMENTS

| | | | | |
|---|---|---|---|---|
| 1,878,128 A | * | 9/1932 | Griswold | .................... 267/286 |
| 2,514,394 A | * | 7/1950 | Irving | ......................... 464/57 |
| 2,704,696 A | * | 3/1955 | Rasmussen | .................. 384/611 |
| 3,141,660 A | * | 7/1964 | Firstbrook et al. | .......... 267/166 |
| 3,779,537 A | * | 12/1973 | Kalister | .................... 267/166.1 |
| 3,854,308 A | * | 12/1974 | Czech et al. | .................. 68/23.3 |
| 4,553,545 A | * | 11/1985 | Maass et al. | ............... 606/198 |
| 4,712,778 A | * | 12/1987 | Newman | ..................... 267/170 |
| 4,886,250 A | * | 12/1989 | Lucas | .......................... 267/95 |
| 4,905,574 A | * | 3/1990 | Trevisan | ..................... 92/69 R |
| 5,246,215 A | * | 9/1993 | Takamura et al. | .......... 267/170 |
| 5,361,500 A | | 11/1994 | Näslund et al. | |
| 5,368,107 A | | 11/1994 | Taomo | ..................... 173/162.2 |
| 6,375,171 B1 | * | 4/2002 | Zimmermann et al. | ..... 267/137 |

FOREIGN PATENT DOCUMENTS

DE    42 01 959    9/1993

* cited by examiner

*Primary Examiner*—Melody M. Burch
(74) *Attorney, Agent, or Firm*—Walter Ottesen (57) ABSTRACT

An antivibration element (1) is especially for a portable handheld work apparatus such as a motor-driven chain saw or a brushcutter. The antivibration element includes a coil spring (2) and at least one guide. An end section (7, 8) of the coil spring (2) is fixed to the guide. In order to provide a progressive characteristic line of the coil spring (2) in a simple way, the coil spring (2) has a transition section (11, 12), which borders at the end section (7, 8) and is guided with play on the guide. When the coil spring is under load, the turns of the transition section come at least in part into contact engagement with a helically-shaped slot in the guide so that the spring stiffness of the antivibration unit increases.

18 Claims, 8 Drawing Sheets

ANTIVIBRATION ELEMENT

BACKGROUND OF THE INVENTION

An antivibration element is disclosed in U.S. Pat. No. 5,368,107 which includes a coil spring. The coil spring is fixed at its ends on an elastic guide element by means of mounts. The damping action of this antivibration element is the same for every load condition because of the linear characteristic line. For reasons of vibration, it is desirable that the antivibration element has a low spring constant in the unloaded state; whereas, under load, the element should be as stiff as possible, that is, the spring constant should be as high as possible.

SUMMARY OF THE INVENTION

It is an object of the invention to provide an antivibration element of the kind described above wherein the entire antivibration element has a different spring constant for different states of loading.

The antivibration element of the invention includes: a coil spring having an end section and a transition section extending from the end section; a guide member; the end section fixed to the guide member; and, the transition section being guided on the guide member with play.

The coil spring is fixed at its end sections. The transition section borders on the end section in a direction toward the center portion of the coil spring. In the unloaded state, the transition section has play with respect to the guide. The play can be radial and/or axial. The turns of the transition section thereby contribute to the spring action. With the deformation of the spring under load, the play is overcome and the turns are at least partially in contact engagement against the guide in the transition section and therefore no longer contribute to the spring action. In this way, the spring stiffness of the coil spring is increased. With different configurations of the guide, a load-dependent damping action can be achieved which is adapted to the particular application. The adaptation of the spring stiffness can take place in dependence upon direction, for example, in that different play is provided in the axial and radial directions.

It is practical to fix the end section to the guide so that it is form tight thereon. The end section can extend over a ¾ turn to 2 turns and extends especially approximately over 1¼ turns of the coil spring. In this way, the coil spring is adequately fixed. At the same time, the number of spring-acting turns is comparatively large for a pregiven spring length. The transition section advantageously extends over approximately 1 to 4 turns. The spring stiffness can be adequately varied in this way. An adequate movability of the spring in the non-guided region is simultaneously ensured.

In order to obtain different spring stiffnesses in different directions, the two ends of the coil spring are twisted toward each other, especially, approximately by a half turn. In order to make possible an adequate variation of the spring constant, the coil spring is guided at both end sections with play in the region of the transition section.

The guide is formed on a plug projecting into the interior of the coil spring and this plug has a receptacle for an attachment means. However, a guide on the outer side of the coil spring can be practical. The guide is advantageously configured as a spirally-shaped slot wherein the turns of the coil spring are guided. The assembly of the guide in the coil spring can be effected in this way by a simple threaded engaging. A spirally-shaped slot of this kind is easy to produce with low manufacturing tolerances. The distance of the base of the slot to the longitudinal center axis of the coil spring decreases in the transition section with increasing distance from the end section. The play in the transition section therefore increases in a direction toward the center portion of the coil spring. With increasing load and with the increasing deformation resulting therefrom, more turns core continuously into contact engagement against the guide so that the spring constant increases in correspondence to the reduction of the spacing. In this way, a good guide characteristic of the work apparatus is achieved.

The slot advantageously has a trapezoidally-shaped cross section which is easy to produce. The flanks of the slot and the longitudinal center axis of the coil spring conjointly form an angle which is less than 90°. This angle especially amounts to approximately 30° to 80°. With increasing deformation of the coil spring, the play therefore becomes less in axial direction. It can, however, be practical that the slot has the shape of a segment of a circle when viewed in cross section. In this way, another course of the spring stiffness is achieved. With the variation of the slot cross section, different courses of spring stiffness can be realized in dependence upon the deformation path and the deformation direction.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
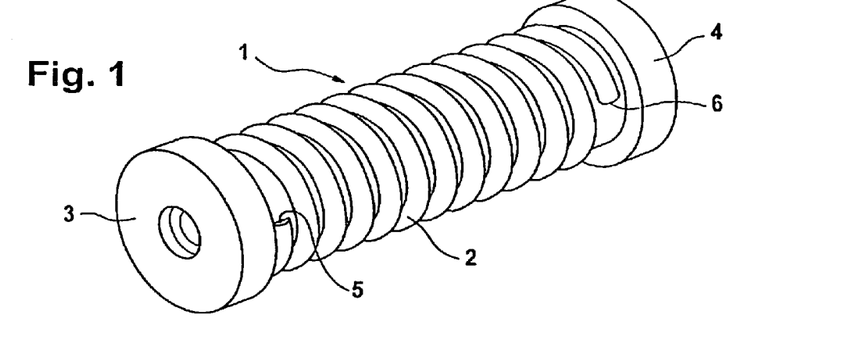
FIG. 1 is a perspective view of the antivibration element of the invention in the unloaded state.
Figure 2:
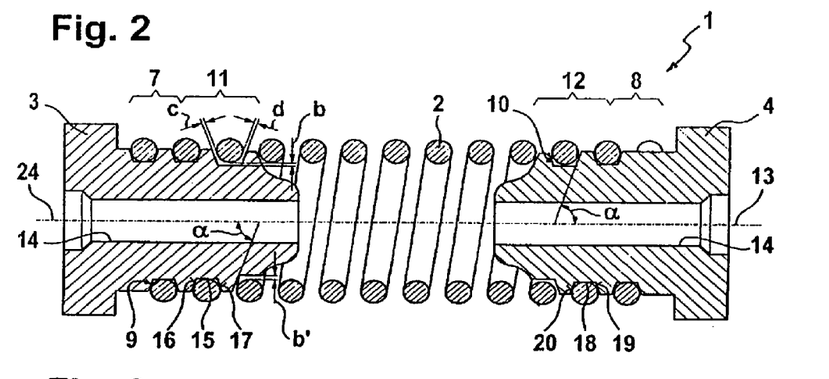
FIG. 2 is a longitudinal section taken through the antivibration element of FIG. 1.

The antivibration element 1 is shown in a perspective view in FIG. 1 and includes a coil spring 2 guided at its two ends on respective plugs (3, 4). As shown in FIG. 2, the plugs (3, 4) extend into the interior of the coil spring 2. Each plug (3, 4) includes a spirally-shaped slot (9, 10) which forms the guide for the coil spring 2. The coil spring 2 is guided with its end sections (7, 8) form tight in the slots (9, 10), respectively. The end sections (7, 8) extend over a ¾-turn to two turns and especially over approximately 1 and ¼-turns of the coil spring 2. The number of turns is measured from the ends 5 and 6 of the coil spring 2 shown in FIG. 1. Transition sections 11 and 12 extend from end sections 7 and 8, respectively, to the mid section of the coil spring and extend over approximately 1 to 4 turns. The coil spring 2 is guided with play in the slots 9 and 10 at the transition sections 11 and 12, respectively.

Figure 3:
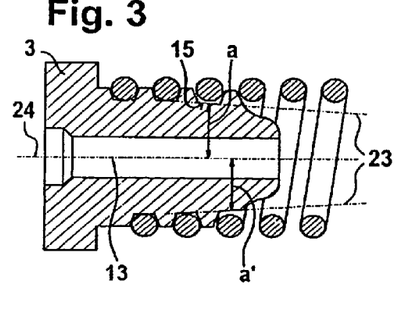
FIG. 3 is a schematic showing a guide of the antivibration element of FIG. 2 for an unloaded coil spring.

The slot 9 is configured in the plug 3 and has a trapezoidally-shaped cross section. The slot base 15 runs approximately parallel to the longitudinal axis 13 of the coil spring 2. The flanks 16 and 17 delimit the slot 9 in the direction of the longitudinal axis 13. The flanks 16 and 17 are inclined at an angle α to the longitudinal axis 13. Correspondingly, the slot 10, which is formed in plug 4, has a slot base 18 which runs parallel to the longitudinal axis 13. The slot 10 also has flanks 19 and 20 which are inclined at an angle cx to the longitudinal axis 13. The angle a is less than 90° and is especially approximately 30° to 80°. The slot bases (15, 18) each have a play (b) to the coil spring 2. The play (b) increases with increasing distance from the end sections (7, 8). As shown in FIG. 2, the play (b) increases in the course of a half turn of the coil spring 2 to the play (b'). As shown in FIG. 3, the distance (a) of the slot base 15 to the longitudinal axis 13 of the coil spring decreases to the distance a'. The line 23 is formed by the course of the base 15 of the slot in the transition section 11 and this line thereby runs conically in a direction toward the center of the coil spring 2.

In the axial direction, the coil spring 2 has play (c) to the flank 16 and has play (d) to flank 17. Accordingly, the coil spring 2 has play relative to the plug 3 in radial and axial direction in the transition section 11. The coil spring 2 has the corresponding play in the transition section 12 to the plug 4. The plugs 3 and 4 can, however, be configured to be different so that the transition sections 11 and 12 have different play to the plugs 3 and 4 in the axial and/or radial directions.

Figure 4:
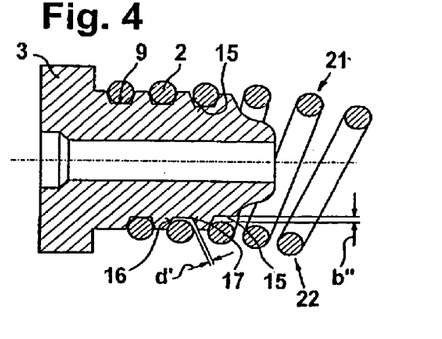
FIG. 4 is a schematic of the guide element of FIG. 3 with the coil spring under load.

In a deformation of the coil spring 2 as shown in FIG. 4, the spacing of the coil spring 2 to the slot 9 reduces on the bending outer end 21. As shown in FIG. 4, the coil spring 2 lies against the slot base 15. The turn which is in contact engagement does not contribute any longer to the spring action. The number of spring-acting turns is reduced and therefore the spring stiffness of the coil spring 2 is increased. At the bending end 22, the play in the slot base 15 increases to the play b". The coil spring 2 lies against the first flank 16 while the play d' to the second flank 17 is increased relative to the unloaded state.

As shown in FIG. 4, the turns of the transition section 11 (see FIG. 2) come at least in part into contact engagement with helically-shaped slot 9 of the guide member 3 with the coil spring under load. From a comparison of FIGS. 3 and 4, it can be seen that the number of turns of the spring in contact engagement with the guide member 3 is greater in FIG. 4 than in FIG. 3 so the spring stiffness of the coil spring 2 is increased.

Figure 24:
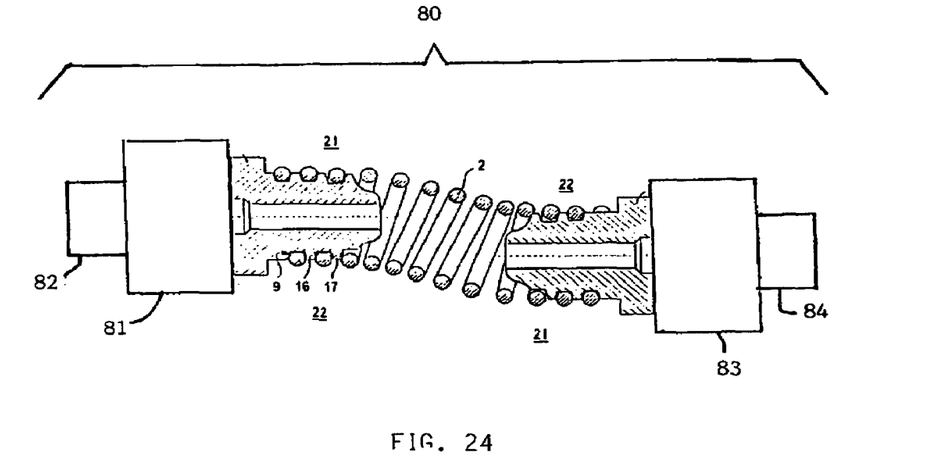
FIG. 24 shows a schematic representation of a portable handheld work apparatus.

For fixing the coil spring, for example, in a portable handheld work apparatus 80 (FIG. 24), one end 5 of the coil spring 2 is fixed to a first housing part 81 and a second end 6 of the coil spring 2 is fixed to a second housing part 82. For fixing the coil spring 2 to the housing parts (81, 82) shown in FIG. 24, the plugs (3, 4) each have longitudinal bores 14 which function to accommodate an attachment means. This means can, for example, be a pin projecting into the longitudinal bore 14. However, it can be practical to provide an internal thread on the inner bore 14 and to threadably engage a screw into a plug 3 or 4 for fixing. The first housing part 81 can, for example, be a component connected to the drive motor 82 of the work apparatus while the second housing part 83 can be connected to a handle 84 of the work apparatus.

Figure 5:
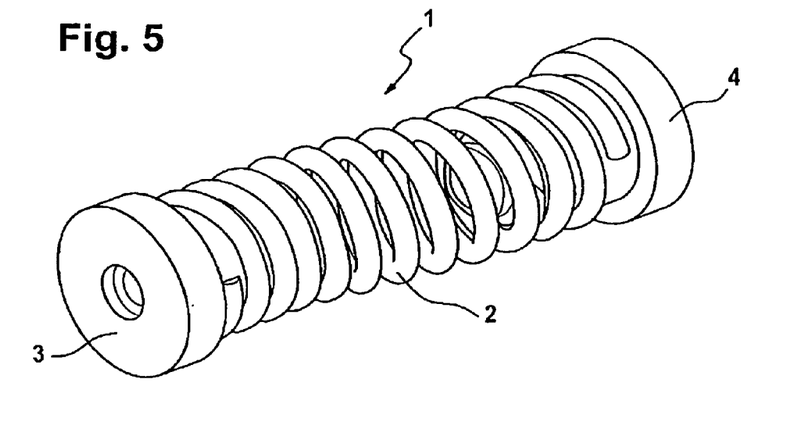
FIG. 5 is a perspective view of the antivibration element of FIG. 1 with a single axis deformation.
Figure 6:
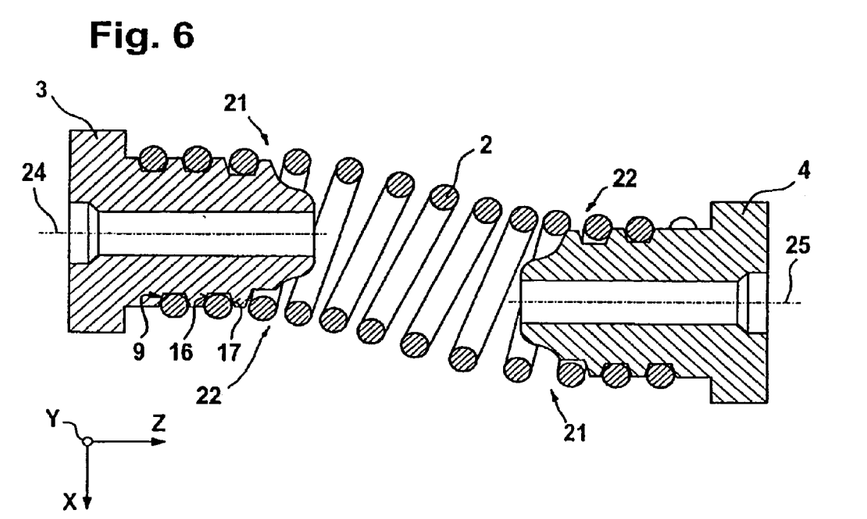
FIG. 6 is a section view taken through the antivibration element of FIG. 5.

In FIGS. 5 and 6, the antivibration element 1 is deformed perpendicularly to the longitudinal center axis 24 of the plug 3 and the longitudinal center axis 25 of plug 4. In FIGS. 5 and 6, the deformation is 7 mm in the direction of the X-axis. The longitudinal center axis 25 of the plug 4 is therefore displaced by 7 mm in the direction of the K-axis with respect to the longitudinal center axis 24 of the plug 3. As shown in FIG. 6, the Z-axis runs in the direction of the longitudinal center axes 24 and 25 and the Y-axis extends perpendicularly into the plane of the drawing. With the deformation, the distance of the coil spring 2 to the plugs 3 and 4 in the slot base is increased by the deformation on the bending inner side 22. The coil spring 2 lies against the flank 16 of the slot 9 while play is present with respect to flank 17. The same applies for the bending inner side 22 and the plug 4. The coil spring 2 lies against corresponding plugs 3 and 4 on the bending outer side 21. The number of spring-acting turns of the coil spring 2 is thereby reduced and the spring stiffness is increased compared to the unloaded state.

Figure 7:
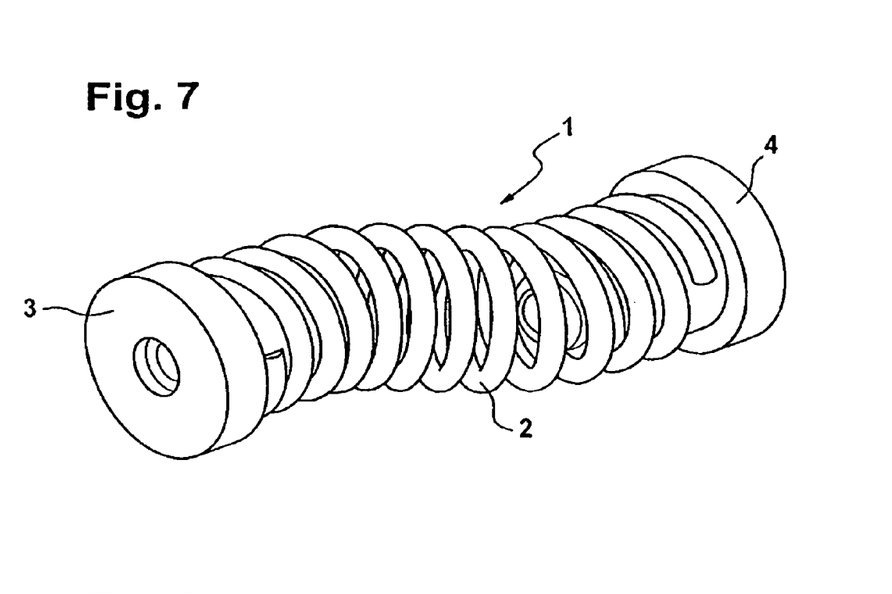
FIG. 7 is a schematic of the antivibration element of FIG. 1 under a two-axis deformation.
Figure 8:
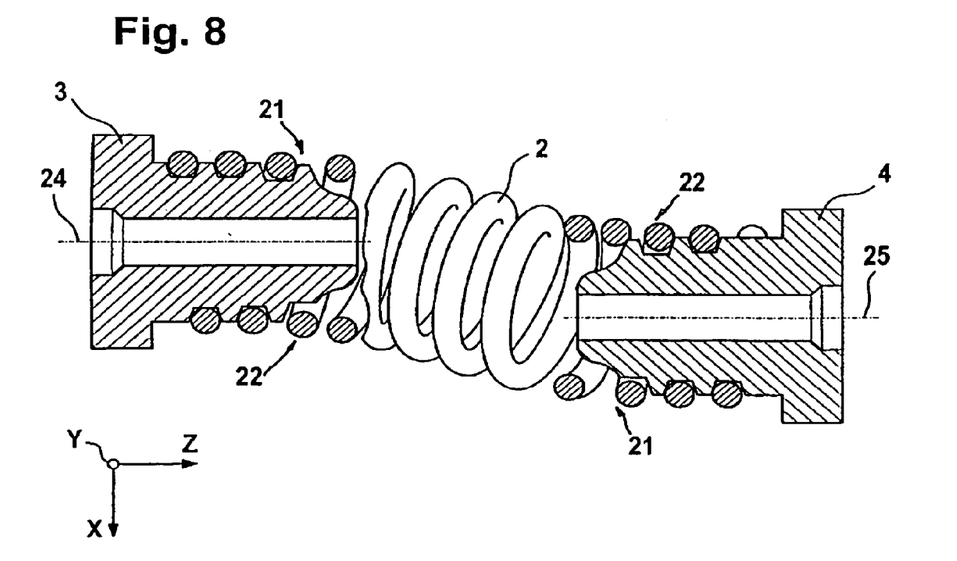
FIG. 8 is a section view taken through the antivibration element of FIG. 7.

In FIGS. 7 and 8, the antivibration element 1 is shown for a deformation of 7 mm in the X-direction and, in the Y-direction, of −7 mm. The longitudinal center axis 24 of the plug 3 includes a spacing of 7 mm with respect to the longitudinal center axis 25 of the plug 4 in the X-direction as well as in the Y-direction. Here too, the turns of the bending outer side 21 lie on each of the plugs 3 and 4 so that the number of spring-acting turns is reduced relative to the unloaded state and the spring constant is increased.

Figure 9:
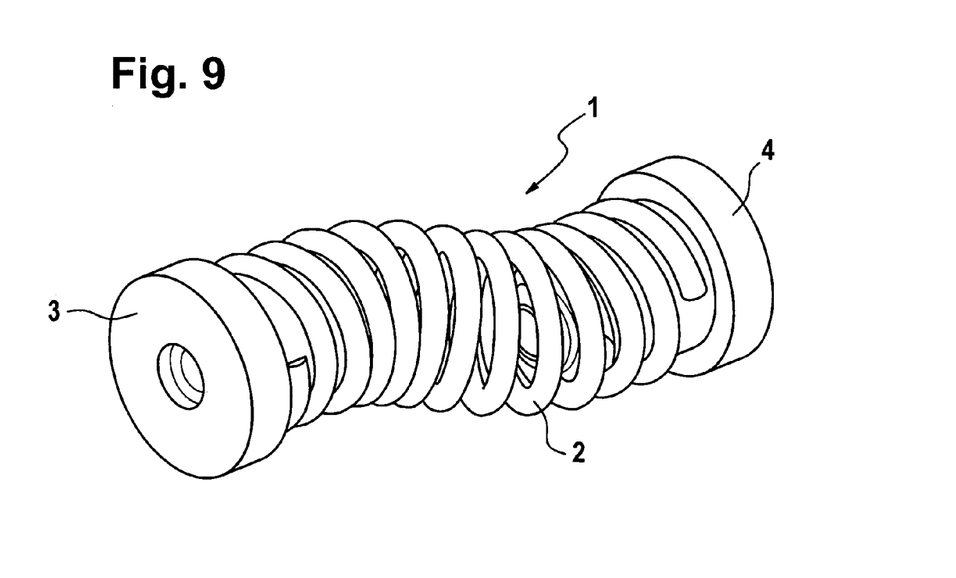
FIG. 9 is a perspective view of the antivibration element of FIG. 1 for a deformation and compressive action in the longitudinal direction.
Figure 10:
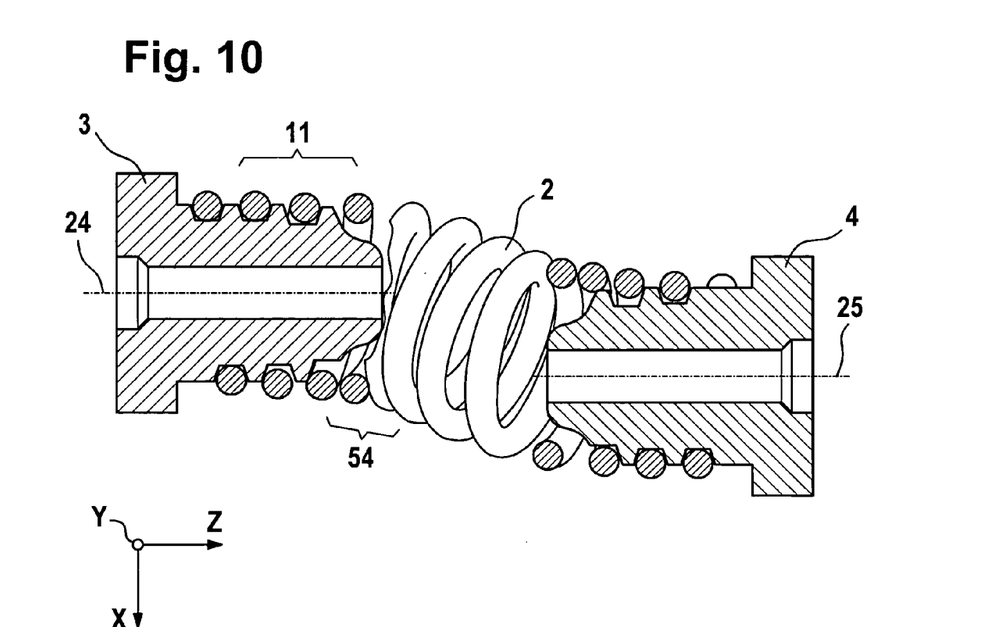
FIG. 10 is a section view through the antivibration element of FIG. 9.
Figure 11:
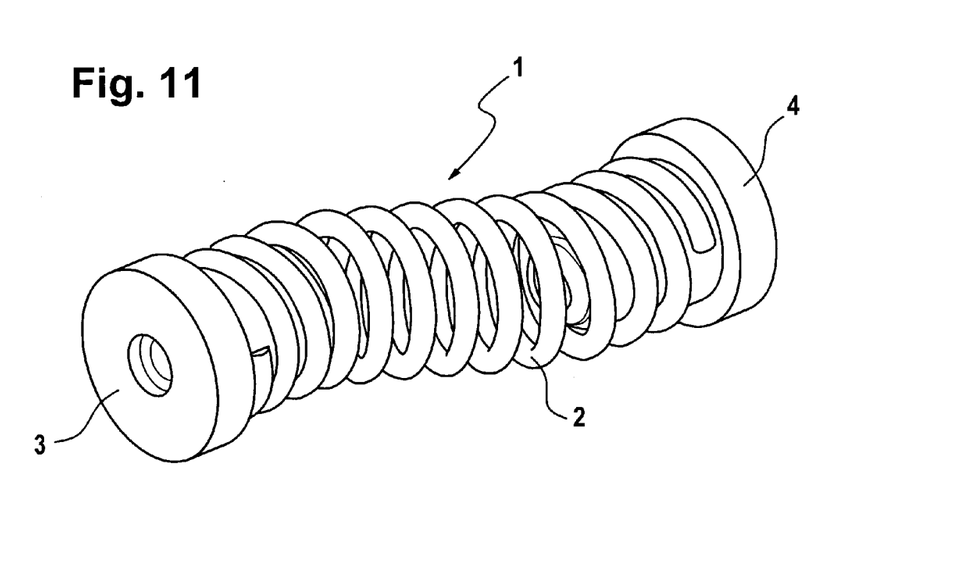
FIG. 11 is a perspective view of the antivibration element of FIG. 1 during deformation and expansion.
Figure 12:
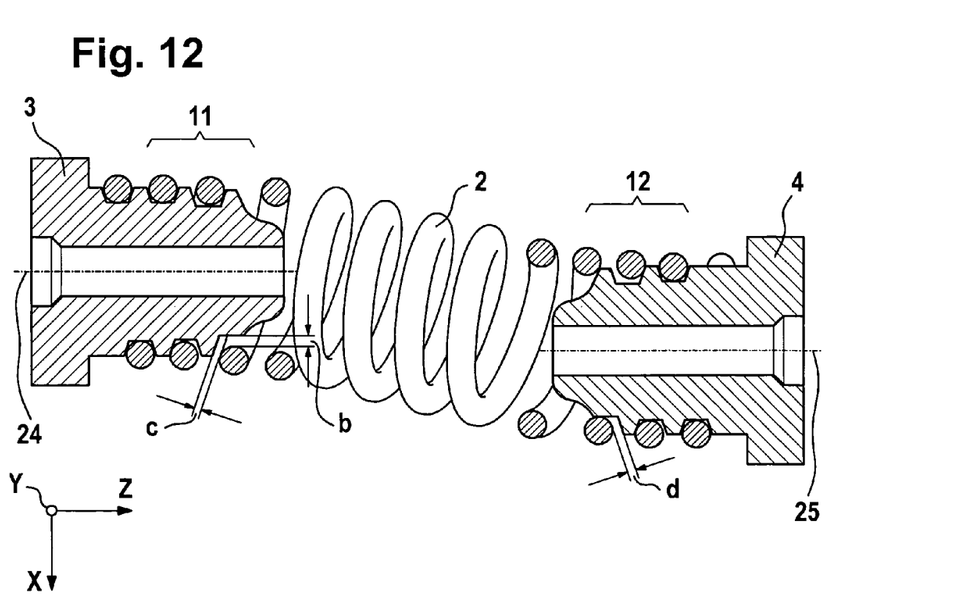
FIG. 12 is a section view taken through the antivibration element of FIG. 11.

In FIGS. 9 and 10, the antivibration element 1 is, in addition to the deformation in the X-direction by 7 mm and the deformation in the Y-direction by −7 mm, shortened by 5 mm in the direction of the Z-axis and, in FIGS. 11 and 12, the antivibration element 1 is lengthened additionally by 5 mm. As shown in FIG. 10, the spring constant of the coil spring 2 is further reduced when there is an intense deformation and shortening of the antivibration element. This is achieved in that the turns of the coil spring 2 in a region 54 of the coil spring bordering on the transition section 11 are in contact engagement with each other. The turns lie, as above, against the plugs 3 and 4. In contrast to this, in the extension of the antivibration element 1 shown in FIGS. 11 and 12, the turns of the coil spring 2 already have a radial play (b) and an axial play (c) and (d) in the transition sections 11 and 12. Accordingly, in the deformation state shown in FIGS. 11 and 12, the spring constant of the coil spring 2 is less than in the deformation state shown in FIGS. 9 and 10.

Figure 13:
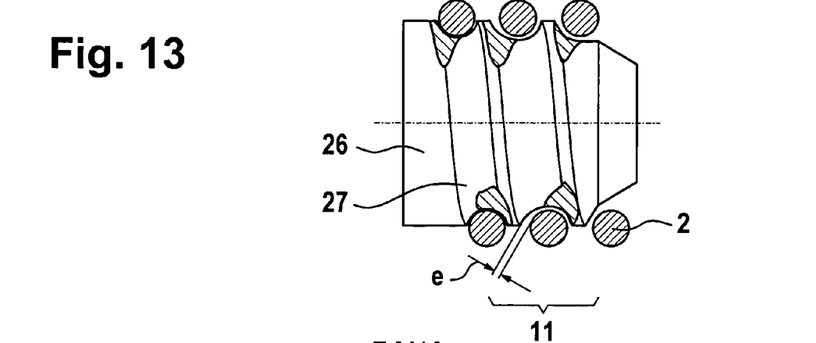
FIG. 13 is a section view of a plug with a coil spring.
Figure 14:
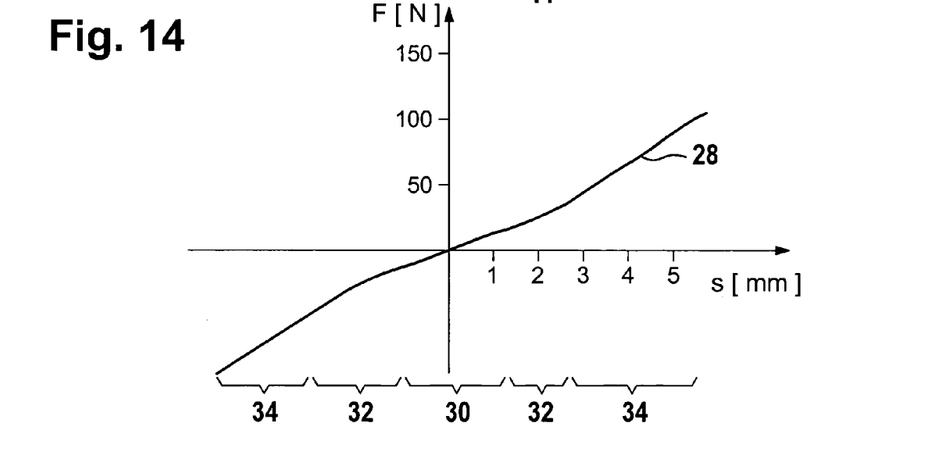
FIG. 14 is a force/displacement diagram for the plug of FIG. 13.
Figure 15:
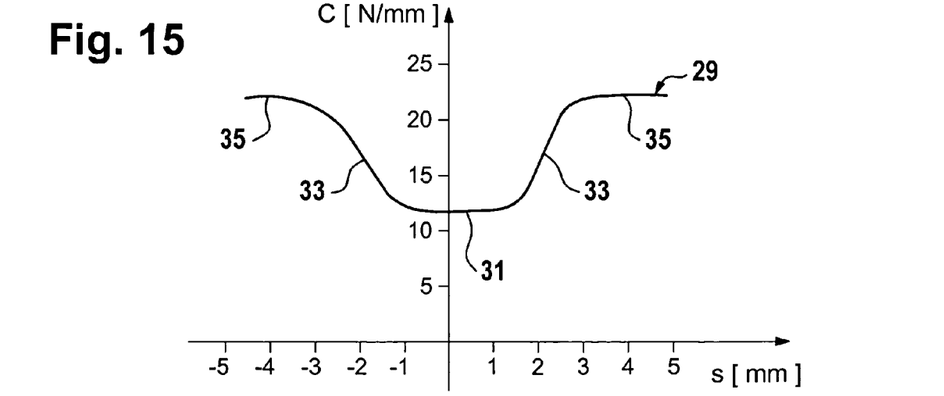
FIG. 15 shows the spring stiffness plotted as a function of the deformation for the plug of FIG. 13.

In FIG. 13, a plug 26 having a slot 27 is shown wherein a coil spring 2 is guided. The slot 27 has an approximately circular-shaped cross section which has a play (e) to the coil spring 2 in the axial and radial directions in a transition section 11 of the coil spring 2. In FIG. 14, the force/displacement diagram for an antivibration element having a plug 26 is shown and, in FIG. 15, the course of the spring constant C is shown plotted as a function of displacement (s). In region 30, the force F to displacement (s) runs as indicated by line 28 approximately constant. In this region of the deformation, the turns in the transition regions 11 and 12 of the coil spring are movable relative to the guide and therefore have a play to the slot 27. In the bordering region 32 and starting from the end sections 7 and 8, the turns of the coil spring 2 lie more and more against the guide in the transition regions 11 and 12. The force, which is necessary for deforming the coil spring 2, increases overproportionally in the region 32. The course of the spring constant C is shown by line 29 in FIG. 15. As shown in FIG. 15, the spring constant C runs approximately constant in the region 31 which corresponds to the region 30 in FIG. 14. With increasing deformation, the spring constant C increases in the regions 33 which correspond to the regions 32 in FIG. 14. If all turns lie against the guide in the transition region, then the spring constant C remains constant in the regions 35. In the corresponding region 34 of the line 28, the force F, which is necessary for deformation, remains proportional to the deformation displacement (s).

Figure 16:
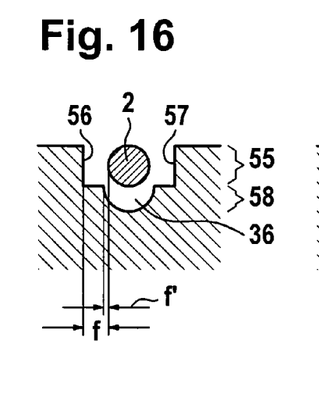
FIGS. 16 to 23 show variations for the guide in section.

The slot, in which the coil spring 2 is guided in the transition region, can have the most different cross-sectional forms adapted to the particular application. The slot 36, which is shown in cross section in FIG. 16, has in its upper region 55 flanks 56 and 57, which run perpendicular to the longitudinal axis 13 of the coil spring 2. In a lower region 58 extending directly therefrom, the slot 36 has a circular-shaped cross section. With slight deformation, the coil spring 2 is in the upper region 55 of the slot 36 and has axial play (f) to the flanks 56 and 57. For a deformation of the coil spring 2 and for a reduction of the radial play caused thereby, the axial play (f) reduces to a value f' as soon as the coil spring 2 is in the lower region 58. The spring stiffness C increases greatly thereby with deformation of the coil spring 2.

Figure 17:
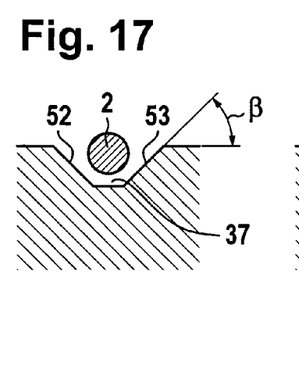

In FIG. 17, a slot 37 is shown having a trapezoidally-shaped cross section. The flanks 52 and 53 of the slot 37 are inclined relative to the longitudinal axis 13 of the coil spring 2 by an angle β which corresponds to approximately 45°. With the variation of the angle β, the increase of the spring stiffness C can be adjusted when the coil spring 2 is deformed.

Figure 18:
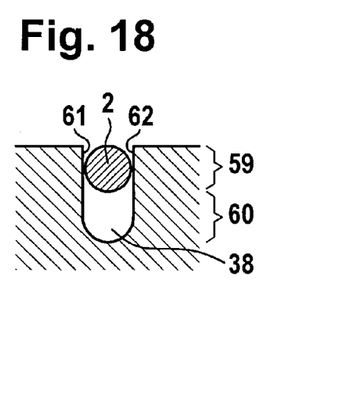

In FIG. 18, a slot 38 is shown which, in an upper region 59, has flanks 61 and 62 which run parallel to each other and which run perpendicular to the longitudinal axis 13 of the coil spring 2. In a lower region 60, the slot 38 is configured to have a circular-arc shape. The coil spring 2 is guided in the slot 38 with a radial play but without axial play.

Figure 19:
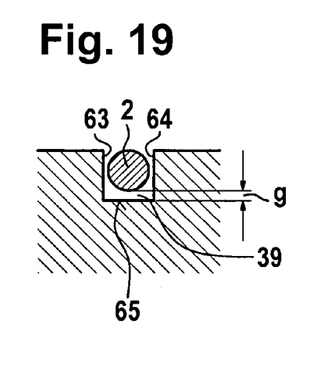

FIG. 19 shows a slot 39 having an approximately quadratic cross section. The coil spring 2 has a play (g) to the flanks 63 and 64 and to the slot base 65. The distance between spring and slot can be equal in all directions or it can be different depending upon direction. Rectangular-shaped slot cross sections can also be advantageous.

Figure 20:
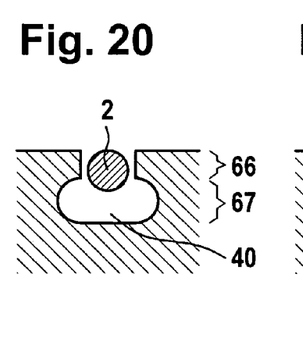

In FIG. 20, a slot 40 is shown which has only a slight axial play in an upper region 66. The flanks of the slot 40 run perpendicular to the longitudinal axis of the coil spring 2 in this region and parallel to each other. The coil spring 2 is guided tightly between the flanks in axial direction. In a lower region 67, the slot 40 expands in the axial direction so that, for increasing deformation, the play in the axial direction increases whereas, the play in the radial direction decreases because of the reduced spacing.

Figure 21:
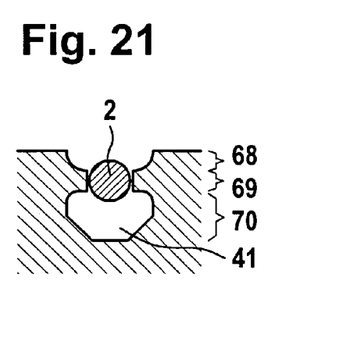

FIG. 21 shows a slot 41 which, in an upper region 68, has a large axial play and, in a center region 69, very slight axial play and, in a lower region 70, has large axial play. For this purpose, in the center region 69, the slot 41 is constricted. The spring stiffness does not increase continuously but reduces again as soon as the coil spring 2 is in the lower region 70.

Figure 22:
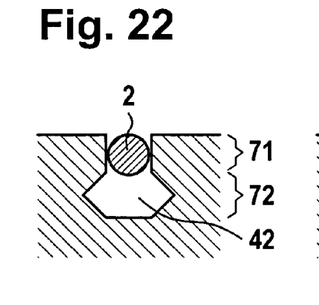

In the slot 42 shown in FIG. 22, the coil spring 2 is tightly guided in an upper region 71 in axial direction. Axial play is not present in the upper region 71. In a lower region 72, the slot 42 first widens in order to then again narrow. The slot 42 has an approximately hexagonally-shaped cross section in the lower region 72.

Figure 23:
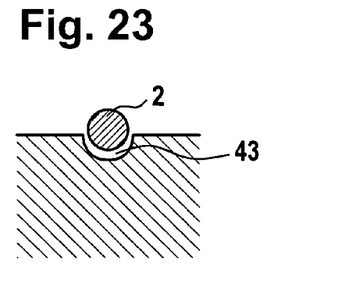

The slot 43 shown in FIG. 23 has an approximately circular-arc shaped cross section. The cross section of the slot 43 can, however, also be configured to be elliptical. Depending upon the desired change of the spring constant C and the permitted maximum deformation, other cross sections of the guide can be practical. The cross section can be adapted to the wanted progression of the characteristic line of the antivibration element. Instead of providing a plug for a guide, the coil spring 2 can also be guided on its periphery. The progression of the antivibration element can likewise be adjusted via the conicity of the slot spiral. A direction-dependent progression can be achieved in that the ends 5 and 6 of the coil spring are rotated relative to each other. Also, a depth, which is different in different directions, and/or a wide slot spiral can be advantageous.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:

a first housing part;

a drive motor connected to said first housing part;

a second housing part and a handle connected to said second housing part;

an antivibration unit subject to deformation under load during operation of said work apparatus;

said antivibration unit having a spring constant which increases in response to said load and said deformation thereby facilitating a good guidance of said work apparatus when held and used by an operator;

said antivibration unit including:

a coil spring defining a longitudinal axis and having an end section, a mid section and a transition section extending from said end section to said mid section;

said coil spring having a first end fixed to said first housing part and having a second end fixed to said second housing part so as to cause said first housing part to be connected to said second housing part via said coil spring;

a guide member having a helically-shaped guide slot wherein turns of said coil spring are guided;

said end section and said transition section being guided in said helically-shaped guide slot;

said end section being fixed in said helically-shaped guide slot so that said coil spring is fixed to said first housing part via said helically-shaped guide slot;

said guide slot having first and second flanks delimiting said slot in the direction of said longitudinal axis;

said transition section having a first play (c) to said first flank in the direction of said axis and a second play (d) to said second flank;

said helically-shaped guide slot having a base and said transition section being guided on said guide slot with a third play (b) to said base in radial direction so as to cause the turns of said transition section to be moveable in said radial direction relative to said helically-shaped slot in the unloaded state of said antivibration unit and contribute to the spring action of said antivibration unit; and, wherein said third play (b), which is present in radial direction, is overcome during the deformation of said coil spring under load in a direction perpendicular to said longitudinal axis and the turns of said transition section come at least in part into contact engagement with said helically-shaped slot so that the spring stiffness of said antivibration unit increases because of said at least in part contact engagement of the turns of said transition section.

2. The work apparatus of claim 1, wherein said end section is fixed form tight on said guide slot.

3. The work apparatus of claim 1, wherein said end section extends over a number of said turns in a range of ¾-turn to greater than 2-turns.

4. The work apparatus of claim 3, wherein said number of said turns is greater than approximately 1¼-turns.

5. The work apparatus of claim 3, wherein said transition section extends over approximately one turn to four turns.

6. The work apparatus of claim 3, wherein said coil spring has first and second ends twisted relative to each other.

7. The work apparatus of claim 6, wherein said first and second ends are twisted relative to each other by approximately a half turn.

8. The work apparatus of claim 3, wherein said end section is a first end section and said coil spring has a second end section; and, said guide member is a first guide member and said guide slot is a first helically-shaped guide slot and said antivibration element comprises a second guide member defining a second helically-shaped guide slot; and, said coil spring is guided at said first and second end sections on said first and second helically-shaped guide slots, respectively.

9. The work apparatus of claim 8, wherein said first and second guide members are configured as first and second plugs projecting into the interior of said coil spring from opposite ends thereof; and, first and second helically-shaped guide slots are formed on said first and second plugs, respectively.

10. The work apparatus of claim 9, each of said first and second plugs having receptacles formed therein for accommodating an attachment device.

11. The work apparatus of claim 9, wherein, in said transition section, the spacing (a, a') of the base of said helically-shaped guide slots to said longitudinal center axis becomes less with increasing distance from the end section.

12. The work apparatus of claim 11, wherein said guide slots each have a trapezoidally-shaped cross section.

13. The work apparatus of claim 12, wherein said trapezoidally-shaped guide slot has first and second flanks defining respective angles ($\alpha$, $\beta$) with said longitudinal center axis of said coil spring which are each less than 90°.

14. The work apparatus of claim 13, wherein said angles ($\alpha$, $\beta$) lie in a range of 30° to 60°.

15. The work apparatus of claim 9, wherein said guide slots each have a circular-arc-shaped cross section.

16. The work apparatus of claim 1, wherein said spring stiffness is reduced when said antivibration unit is not subjected to load and said spring stiffness is increased when said antivibration unit is under load.

17. The work apparatus of claim 16, wherein said third play (b) between said coil spring and said base becomes greater with increasing distance from said end section when said antivibration unit is not under load; in a first cross section of said coil spring in said transition section, said third play (b) corresponds to a first distance from said base; said third play (b) increases to correspond to a second distance (b') from said base greater than said first distance in the course of a half turn of said coil spring so that with increasing load and the deformation of said coil spring associated therewith more turns of said coil spring come at least in part into contact engagement with said helically-shaped guide slot thereby increasing said spring stiffness.

18. The work apparatus of claim 17, wherein said coil spring has a center between first and second ends; said base of said helically-shaped slot is at a spacing (a) to said longitudinal axis; and, said spacing (a) becomes less with increasing distance from said end section of said coil spring so that a line passing through said base at successive turns of said slot within said transition section runs toward said center on an imaginary conical surface.

* * * * *

UNITED STATES PATENT AND TRADEMARK OFFICE
CERTIFICATE OF CORRECTION

| | | |
|---|---|---|
| PATENT NO. | : 7,270,320 B2 | Page 1 of 1 |
| APPLICATION NO. | : 10/629674 | |
| DATED | : September 18, 2007 | |
| INVENTOR(S) | : Johannes Menzel et al. | |

It is certified that error appears in the above-identified patent and that said Letters Patent is hereby corrected as shown below:

Column 1 :
Line 53: delete "different." and substitute -- different -- therefor.

Column 2 :
Line 6: delete "core" and substitute -- come -- therefor.

Column 3 :
Line 29: delete "cx" and substitute -- $\alpha$ -- therefor.
Line 30: delete "a" and substitute -- $\alpha$ -- therefor.

Column 4 :
Line 24: delete "K-axis" and substitute -- X-axis -- therefor.

Signed and Sealed this

Eighteenth Day of December, 2007

JON W. DUDAS
*Director of the United States Patent and Trademark Office*